March 9, 1965 H. STUMPP 3,172,698

FOLDABLE FRAME STRUCTURE FOR AN AMBULANCE FOR SUPPORTING A PLURALITY OF STRETCHERS

Filed Feb. 21, 1962 6 Sheets-Sheet 1

INVENTOR

Hans Stumpp

BY

Michael S. Striker

ATTORNEY

INVENTOR
Hans Stumpp

BY

Michael S. Striker
ATTORNEY

INVENTOR
Hans Stumpp

BY

Michael S. Striker
ATTORNEY

INVENTOR
Hans Stumpp

BY

Michael S. Striker
ATTORNEY

March 9, 1965 H. STUMPP 3,172,698

FOLDABLE FRAME STRUCTURE FOR AN AMBULANCE FOR SUPPORTING A PLURALITY OF STRETCHERS

Filed Feb. 21, 1962 6 Sheets-Sheet 5

INVENTOR
Hans Stumpp

BY

Michael S. Striker
ATTORNEY

March 9, 1965 H. STUMPP 3,172,698

FOLDABLE FRAME STRUCTURE FOR AN AMBULANCE FOR SUPPORTING A PLURALITY OF STRETCHERS

Filed Feb. 21, 1962 6 Sheets-Sheet 6

INVENTOR
Hans Stumpp

BY

Michael S. Striker
ATTORNEY

United States Patent Office 3,172,698

Patented Mar. 9, 1965

3,172,698

FOLDABLE FRAME STRUCTURE FOR AN AMBULANCE FOR SUPPORTING A PLURALITY OF STRETCHERS

Hans Stumpp, Lorch, Wurttemberg, Germany, assignor to Lorcher Karosseriefabrik Binz & Co., Lorch, Wurttemberg, Germany, a firm of Germany Filed Feb. 21, 1962, Ser. No. 174,739
14 Claims. (Cl. 297—118)

The present invention relates to a frame structure for supporting a plurality of stretchers in an ambulance or other vehicle, and especially two stretchers above each other, and it is an object of this invention to provide a frame structure of this kind which is of a very simple but solid construction and may be very solidly mounted in the vehicle, and which when folded together will take up the least possible space in the vehicle or when separately transported. A further object of the invention is to provide a frame structure which permits up to three rows of stretcher supports to be erected next to each other with an upper and lower stretcher support in each row, and to provide this frame structure of such a design that, while primarily intended for carrying lateral stretcher supports, it also permits the central row of stretcher supports to be very solidly mounted and to be easily and quickly erected or removed.

The present invention therefore consists essentially in providing a main frame which comprises two main posts at the ends of the frame and transverse frame members connecting these posts, and arms which are pivotable about perpendicular axes for supporting and bracing each stretcher support or serving as feet for the lower stretcher supports.

The framelike structure on the two main posts results in a very solid construction for supporting the stretcher supports. The pivotable arms further permit each frame unit to be folded together to take up the least possible space and also the stretcher supports and other frame members such as a bench or the like to be folded against the main frame.

Another important feature of the invention consists in providing two frame units carrying stretcher supports in a symmetrical arrangement and spaced from each other so as also to serve as means for carrying one or two central stretcher supports. This is attained according to the invention by supporting the upper central stretcher support on the lateral stretcher supports by providing each of the two guide rails of the upper central stretcher support on a pair of supporting brackets which are then in an upright position and are mounted on the adjacent lateral stretcher support so as to be pivotable about a longitudinal axis, and by bracing the two pairs of supporting brackets at the right and left sides against each other by means of bracing members which, if the upper central stretcher support is not to be used but folded together, may be pivoted to an inoperative position, but may when pivoted to a perpendicular transverse plane be rigidly connected through the guide rails to the two pairs of supporting brackets, so that a rigid central frame is thus attained which forms a bridgelike connection between the lateral stretcher supports.

Thus, even though the individual members of the central stretcher support are pivotably and removably connected to each other and to the lateral stretcher supports, a rigid bridgelike structure is attained which cannot collapse even under a great load. This structure also has the advantage that any additional bracing elements may be omitted which connect the pivotable supporting brackets to the lateral stretcher supports so as to maintain the brackets in their upright position. The rigid connection between the bracing members and the supporting brackets of the guide rails thereon may be of a very simple construction in the form of perpendicular joints, that is, joints which extend at right angles to the horizontal joints which connect the supporting brackets to the lateral stretcher supports and which solely by this rectangular arrangement insure the rigidity of the structure within the perpendicular transverse plane.

By staggering the laterally adjacent stretcher supports so as to be located at different heights, the bridgelike design of the entire frame assembly according to the invention has the further advantage that the patients lying on the different stretchers cannot bother each other. Especially the patients lying on the two central stretchers have full elbow room and will not interfere with other patients on the lateral stretcher supports even though they might take up considerable space through braces, casts, splints or the like. Furthermore, the patients on the central stretchers may be very easily loaded thereon because of the lower level of the central stretcher supports.

According to a preferred embodiment of the invention in which several stretcher supports are arranged side-by-side, the central stretcher supports are provided with guide rails extending in the longitudinal direction for sliding the stretchers longitudinally thereon, while the lateral stretcher supports are provided with transverse guide rails or platforms for sliding the stretchers thereon in a transverse direction.

In the latter case, the stretchers are preferably loaded upon their supports by first loading them on the floor of the central aisle of the vehicle from which the central stretcher supports are removed, and by then lifting them to the lateral stretcher supports and sliding them transversely thereon, and by thereafter pivoting the central stretcher supports to their operative position and loading the stretchers thereon from the rear of the vehicle.

The guide rails or platforms of the lateral stretcher supports which are designed for sliding the stretchers thereon in the transverse direction also have the advantage that there is no need for any special transversely movable parts which are subject to friction and wear and might also require lubrication and means for holding them in position.

According to a further feature of the invention which is applicable if a higher central stretcher support is supported at both sides thereof by two lower lateral stretcher supports, each supporting member carrying the two lateral stretcher supports and each supporting bracket carrying the central stretcher support on these lateral supports are pivotably connected to an intermediate, transversely adjustable link which, in turn, is pivotably connected to the lateral stretcher support in such a manner that when this link is pivoted and moved transversely along the lateral stretcher support, the joint which connects the supporting bracket of the central stretcher support with the intermediate link may be shifted upwardly and in the direction toward the side of the vehicle so as to permit the supporting bracket to be pivoted downwardly without engaging with any other parts.

This construction overcomes a great deal of the difficulty which is due to the fact that the pivotable parts of the stretcher supports should be arranged in such a spaced relation to each other as to take up the least possible space when folded and to permit them to be easily pivoted and folded apart or together. This should also be possible if, after the central stretcher support is removed, at least one lateral stretcher support is also to be replaced by a bench. When the braced central stretcher support is in its operative position, the particular adjustability of the mentioned intermediate link also permits the pivot points of the supporting brackets of this stretcher support to be adjusted to a position relatively close to the center of the vehicle so that, even if the lateral stretcher supports are spaced at a considerable distance from each other, this distance may be bridged without difficulties. On the other hand, if the central stretcher support is not being used, the joint between the lateral stretcher support and the supporting bracket for the central stretcher support may be adjusted to a position so far away from the central aisle that it will not cause any interference. By displacing the joint in the upward direction, it is also possible to increase the distance between the joint and the floor of the vehicle so that even relatively long supporting brackets for the central stretcher support may be pivoted downwardly without coming in contact with the floor or other parts of the vehicle and without interfering with the adjustment or folding of the frame structure.

Further features of the invention consist in the particular details of such a structure with pivotable and transversely adjustable intermediate links which are preferably made in the form of bell cranks and are adapted to be locked in their different end positions, in the particular arrangement and design of the means for locking the stretchers on the transverse giudes or platforms of the stretcher supports, in the particular arrangement of a bench which is adjustable transversely to its longitudinal direction, in the particular pivotal arrangement of a back rest, in a very advantageous placement of folded stretchers on the pivotable feet of the frame, and in numerous other details of the frame structure and stretcher supports according to the invention.

These objects, features, and advantages of the invention will become more clearly apparent from the following detailed description thereof, particularly when the same is read with reference to the accompanying drawings, in which—

FIGURE 13 shows a perspective view of a part of the lateral stretcher support; while

Figure 4:
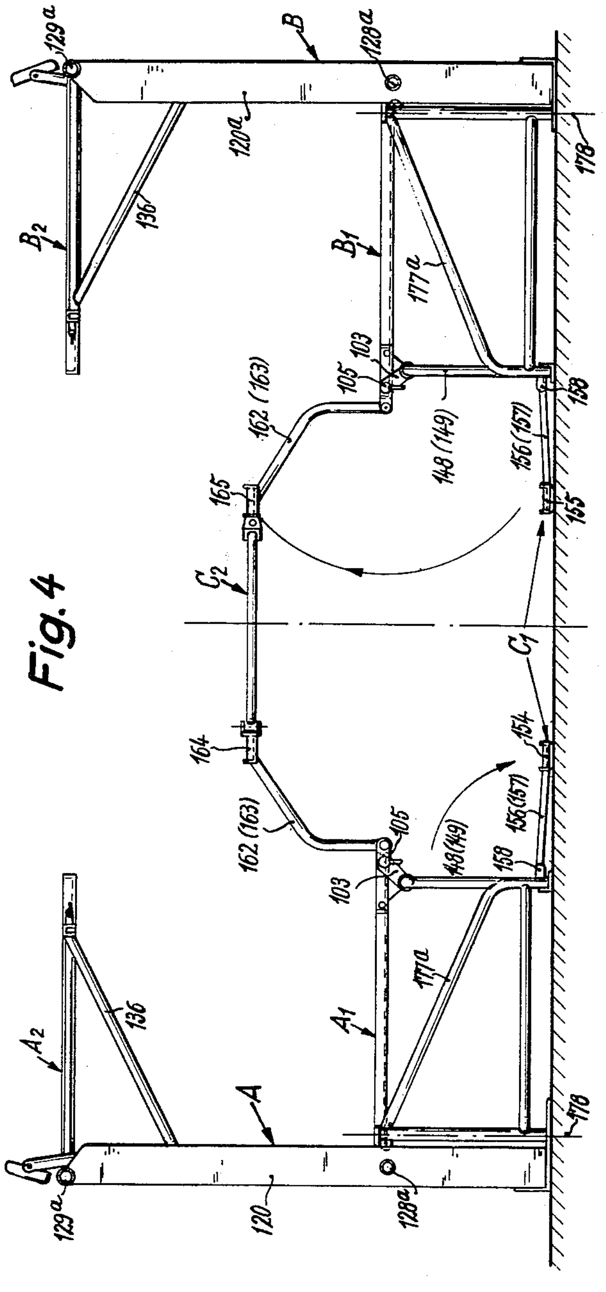
FIGURE 4 shows a front view of the entire frame assembly including two opposite lateral stretcher supporting frames and with the central stretcher supports put up for use.

As illustrated in the drawings and particularly in FIGURE 4, the stretcher supporting structure according to the invention which may be mounted in an ambulance or the like comprises two lateral supporting frames A and B on which left and right stretcher supports $A_1$, $A_2$ and $B_1$, $B_2$, respectively, are mounted. The stretcher supports $A_1$ and $B_1$ together, in turn, support central stretcher supports $C_1$ and $C_2$.

Figures 2, 3:
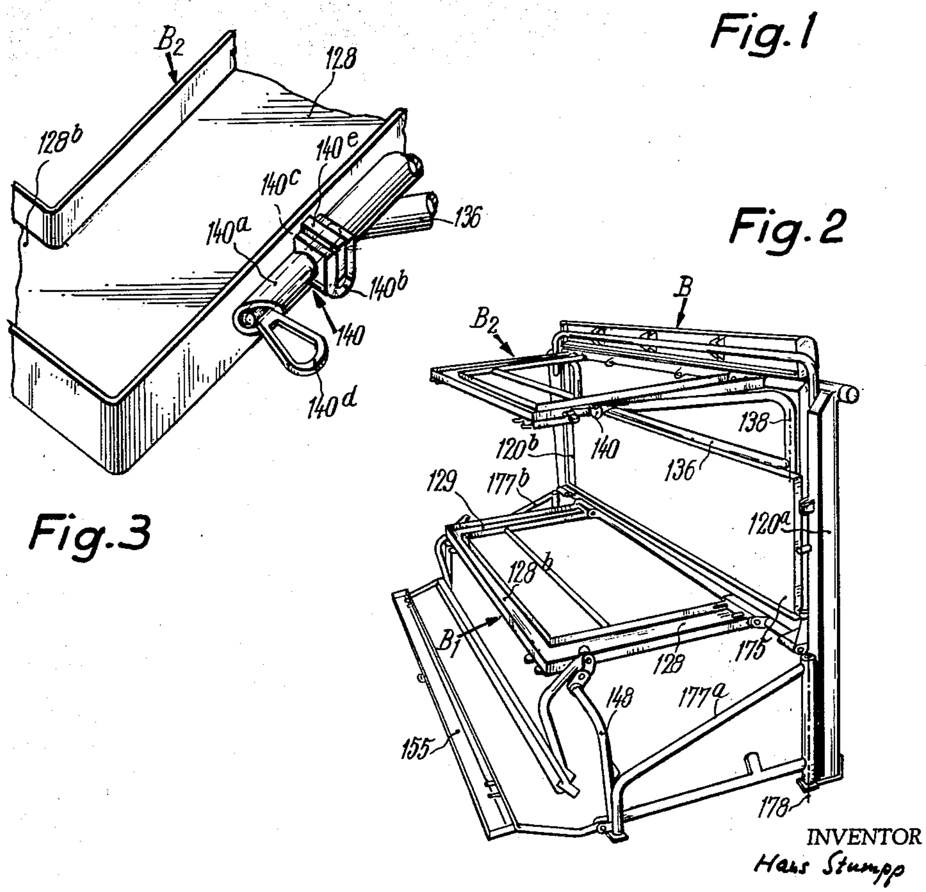
FIGURE 2 shows a perspective view of the frame structure with the lateral stretcher supports in the operative position.
FIGURE 3 shows a device for locking an upper stretcher support on a lateral arm.

As shown particularly in FIGURE 2 which illustrates the supporting frame B, each lateral frame A and B comprises two vertical posts 120*a* and 120*b* on which a pair of arms 177*a* and 177*b* serving as foot braces are mounted so as to be pivotable about perpendicular axes 178. The lateral stretcher supports $A_1$, $A_2$ and $B_1$, $B_2$ are mounted on frames A and B, respectively, so as to be pivotable about horizontal axes 128*a* and 129*a*. The upper stretcher supports $A_2$ and $B_2$ are braced in their erected or operative position by arms 136 which are pivotable about perpendicular axes 138, and they may be removably secured to supports $A_2$ and $B_2$ by locking means 140, as illustrated in detail in FIGURE 3, each of which consists of a tubular part 140*a* which is welded by means of an intermediate U-shaped part 140*b* to the end of arm 136. The tubular part 140*a* contains a locking bolt 140*c* which is slidable therein and adapted under the action of a spring, not shown, to engage into a bore in a lug 140*e* which is secured, for example, by welding, to the respective stretcher support $A_2$ or $B_2$. For disconnecting the arms 136 from the respective stretcher support $A_2$ or $B_2$, locking bolt 140*c* may be pulled out of the bore in lug 140*e* by a handle 140*d* against the action of the mentioned spring.

Each stretcher support $A_1$, $A_2$ and $B_1$, $B_2$ is provided with transverse guide plates 128 and 129 which are interconnected by a longitudinal guide bar 128*b* of a U-shaped cross section. One foot of a stretcher may then be set, for example, upon the transverse guide plate 128 and may then be shifted along the longitudinal guide bar 128*b* to the transverse guide plate 129 at the other end of the stretcher support, whereupon the second stretcher foot on the same side of the stretcher as the first foot may be set on the transverse guide plate 128. Both stretcher feet may then be shifted transversely along plates 128 and 129 until the other pair of feet at the other side of the stretcher may be set upon the stretcher support.

Figure 14:
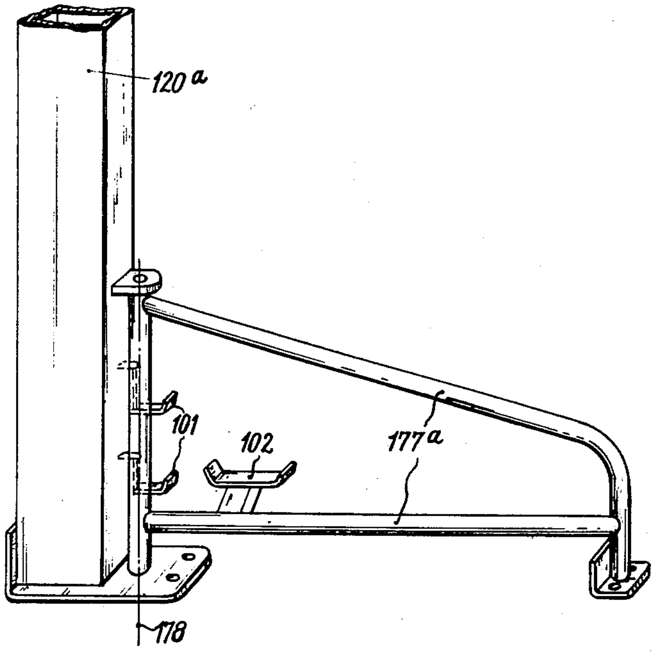
FIGURE 14 shows a perspective view of a part of a post with an arm thereon serving as a bracing member.

As illustrated in FIGURE 14, each main post 120*a* and 120*b* and likewise each arm 177*a* and 177*b* is provided with brackets 101 and 102, respectively, on which unused stretchers may be carried in a folded condition which may then be secured to these brackets by quickly removable straps or the like. Of course, each supporting frame may also be provided with several brackets or similar means for carrying several folded stretchers.

Figure 5:
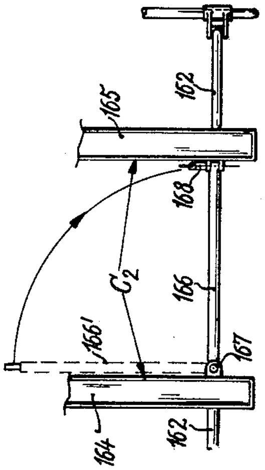
FIGURE 5 shows a plan view of a part of the central stretcher supports.

The upper central stretcher support $C_2$ is pivotably mounted at its front and rear ends of both sides on the lower stretcher supports $A_1$ and $B_1$ by means of two pairs of angular brackets 162 and 163. Each pair of these pivotable brackets carries a guide rail 164 or 165 of the upper central stretcher support. Rails 164 and 165 are braced against each other by pivotable transverse rods 166, as shown particularly in FIGURE 5. Each stretcher support $A_1$ and $B_1$ is further braced on the floor of the ambulance by a pair of feet 148 and 149 and, if desired, the feet of each pair may be additionally connected by a longitudinal member. At the lower ends of feet 148 and 149 guide rails 154 and 155 for supporting a lower central stretcher are pivotably connected by means of arms 156 and 157.

Figure 10:
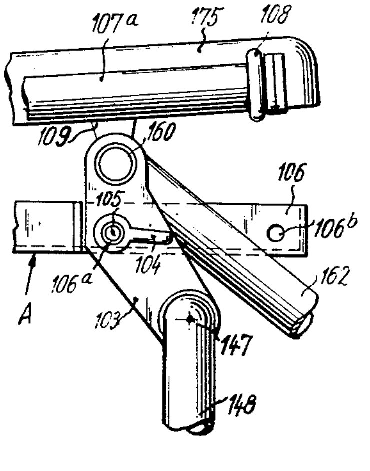
FIGURE 10 shows an enlarged detail view of the encircled part of FIGURE 9.
Figure 11:
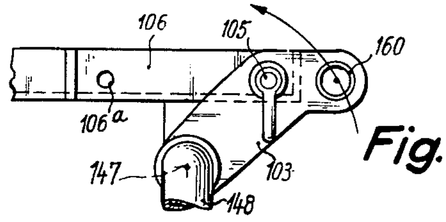
FIGURE 11 shows an enlarged detail view of the same part as shown in FIGURE 10, but in a position for supporting a stretcher.

FIGURES 10 and 11 illustrate the structure for connecting the angular brackets 162 (or 163) and feet 148 (or 149) to the stretcher support $A_1$ (or $B_1$, respectively). These brackets and feet are not directly connected to the stretcher support but by means of an intermediate pivotable link 103 which is slidably adjustable, preferably on a roller, in a guide 106 on the lateral stretcher support by means of a pivot pin 105 which is provided with a handle 104. Guide 106 has two bores 106*a* and 106*b* into which the slidable pivot pin 105 may engage, for example, under spring action, whereby link 103 will be locked in one or the other end position within guide 106. Each bracket 162 (or 163) is pivotably connected to link 103 by a pivot pin 160 and each foot 148 (or 149) by a pivot pin 147.

Link 103 forms a bell crank which is pivotable so that, when the lower lateral stretcher supports are in the operative position according to FIGURE 11, pivot pin 160 at one side of pivot pin 105 serving as the main pivot axis faces in a transverse direction toward the center of the vehicle, while pivot pin 147 is located obliquely underneath in the direction toward the lateral wall of the vehicle. Pivot pin 105 is then arrested in the outer bore **106*b* of guide 106**.

If one of the lower lateral stretcher supports is, however, in the operative position to support a bench 175, the main pivot pin 105 is inserted into bore **106*a*, and pivot pin 160 is then located upwardly, while pivot pin 147 is located obliquely underneath, as seen from the main pivot pin 105**.

Pivot pin 160 serves at the same time as a support for the bench 175 which is mounted on two pipes **107*a* and 107*b* by means of eyebolts 108 which permit the bench to be shifted along pipes 107*a* and 107*b* in the horizontal direction in accordance with arrows $x_1$–$x_2$ to different positions in which the bench may then be locked by setscrews or similar means. Pipes 107*a* and 107*b* then rest by means of brackets 109 on pivot pins 160**.

Each supporting frame A and B further carries a back rest 174 which is independent of the stretcher support and connected to the frame by means of arms **174*a* and 174*b* which are pivotable about a longitudinal axis 174*c*. This back rest 174** may therefore be pivoted upwardly or downwardly independent of the pivotal movement of the upper or lower stretcher supports and be adjusted to the most comfortable position of a person sitting on the bench.

Figure 13:
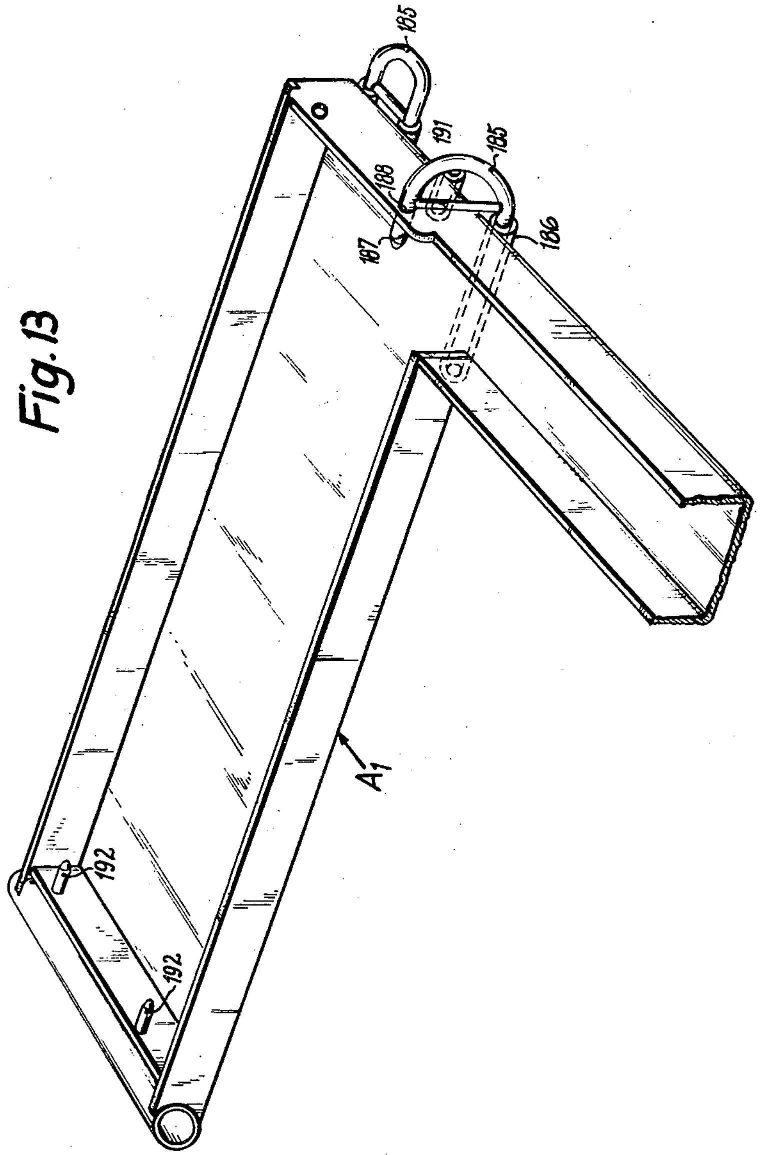

FIGURE 13 shows a device for locking the stretcher feet on one of the stretcher supports, for example, on the support $A_1$. This device consists of a U-shaped shackle 185 with one longer arm which is slidable within a bushing 186 on the stretcher support and the other arm 187 of which may be drawn by the action of a spring in bushing 186 through a bore 188 in the wall of the stretcher support and into a recess in the stretcher foot, while the corresponding foot at the other side of the stretcher is held in position on the stretcher support by a projection 192. FIGURE 13 also illustrates a second foot locking device 185', 192' which may be provided for locking a stretcher the front and back feet of which are spaced at a greater distance from each other. When not in use, the spring-loaded shackle 185 may be pivoted 90° about the axis of its longer arm in bushing 186 and the tip of its shorter arm 187 may be inserted into a bushing 191.

Figure 12:
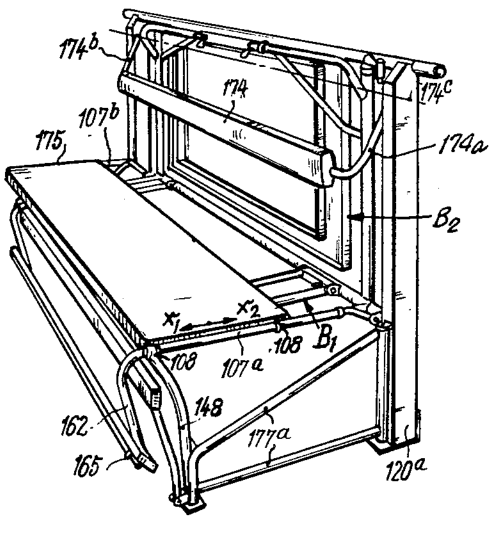
FIGURE 12 shows a perspective view similar to FIGURES 2 and 8, but with the frame in the position for use as a bench.

FIGURE 4 illustrates the entire stretcher supporting unit in the position for the use of all of its six stretcher supports $A_1$, $A_2$, $B_1$, $B_2$, $C_1$, and $C_2$. If the central stretcher supports $C_1$ and $C_2$ are not being used, at first the locks 168 of the transverse bracing rods 166 for the upper stretcher support $C_2$ are opened and these rods are swung about their perpendicular pivots 167 to the position 166'. After the arms 156 and 157 with rails 154 and 155 of the lower central stretcher support $C_1$ have then been swung upwardly about their longitudinal pivots 158, the angular arms 162 and 163 together with rails 154 and 155 of the upper central stretcher support $C_2$ are swung downwardly over the lower stretcher support $C_1$. In order to permit the entire frame structure to be folded together so as take up the smallest possible space, the intermediate links 103 are adjusted by means of their pivot pins 105 from the position according to FIGURE 11 to the position according to FIGURE 10. During this adjustment, the links 103 may slide along the guides 106, preferably on rollers. In this position of links 103 it is possible to pivot the bench 175 downwardly from the position according to FIGURE 2 to the position according to FIGURE 12 without previously requiring the lateral stretcher supports $A_1$ and $B_1$ to be pivoted upwardly. After the upper stretcher support $B_1$ or $B_2$ is pivoted downwardly, it is also possible to pivot the back rest 174 downwardly, for example, to the position as illustrated in in FIGURE 12. As already described, bench 175 is slidable along the pipes **107*a* and 107*b* transversely to its longitudinal direction so that, if it has a relatively small width, it may be shifted forwardly up to the feet 148**.

Figure 1:
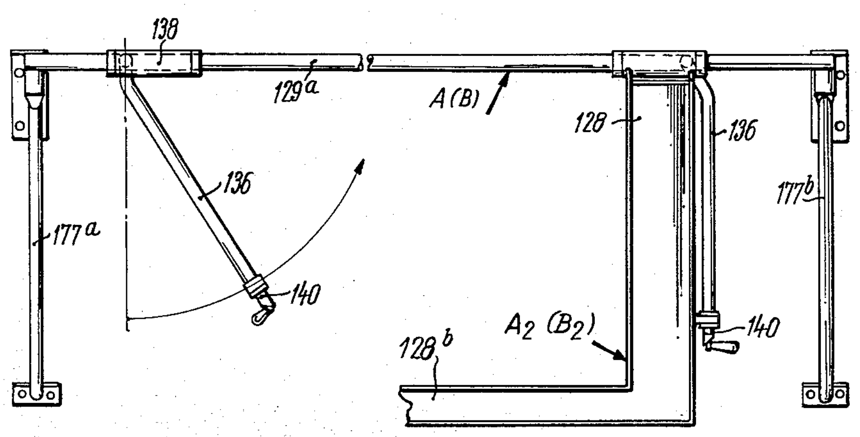
FIGURE 1 shows a plan view of the frame structure.
Figures 6, 7:
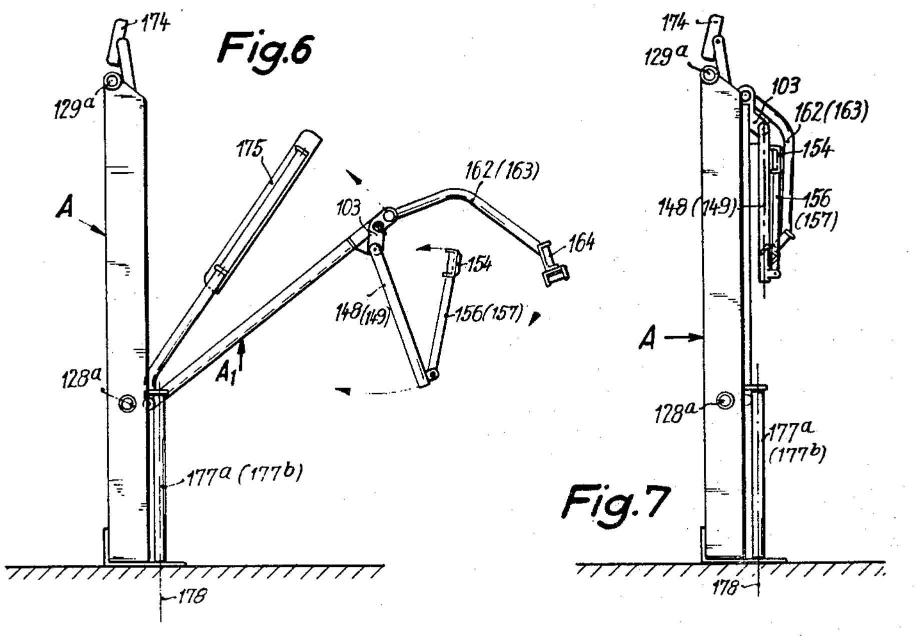
FIGURE 6 shows a front view of a supporting frame in an intermediate position while being folded together.
FIGURE 7 shows a front view of the supporting frame in the collapsed position.
Figure 8:
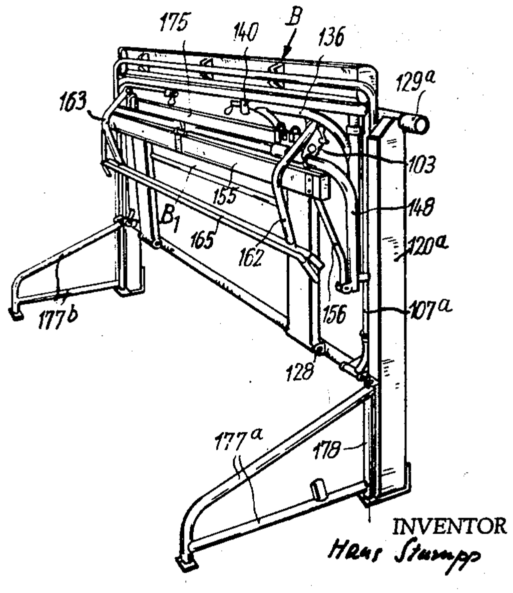
FIGURE 8 shows a perspective view similar to FIGURE 2 but with the supporting frame in the folded position.
Figure 9:
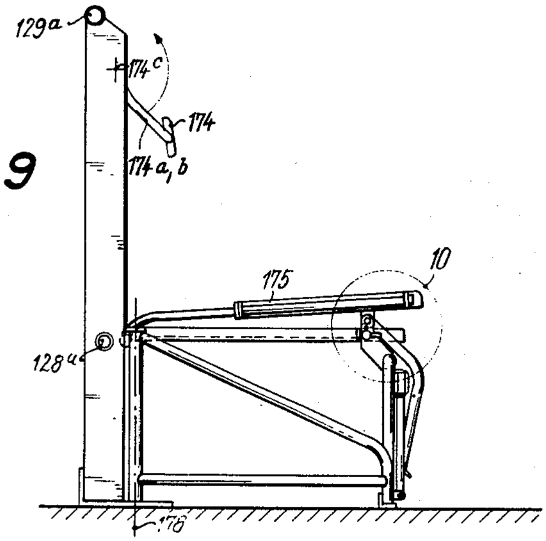
FIGURE 9 shows a front view of a supporting frame in the position when used as a bench.

For folding each supporting frame together, at first the back rest 174 is swung upwardly to the position as illustrated in FIGURE 6, whereupon the bench 175 is also swung upwardly and against the frame. Thereafter the lower stretcher support $A_1$ (or $B_1$) together with its feet 148 and 149 and the arms 156 and 157 carrying the guide rail 154 is folded together in the manner as indicated by the arrows in FIGURE 6, and then the angular brackets 162 and 163 together with guide rail 164 are pivoted over the folded stretcher support $A_1$ (or $B_1$) so that the different elements are then in the position as illustrated in FIGURES 7 and 8. While in FIGURE 8, the arms **177*a* and 177*b* are still in their supporting position, they are shown in FIGURES 6 and 7 also to be pivoted about their perpendicular axes 178 against frame A. FIGURE 1 further shows the manner in which the upper stretcher support is folded together. For this purpose, at first the arms 136 are pivoted about their perpendicular axes 138 toward and against the frame A or B, whereupon the stretcher support $A_2$ or $B_2$ may be swung downwardly about its horizontal longitudinal axis 129*a***.

Naturally, everything which has been described with reference either to the right stretcher supports or to the left stretcher supports is also applicable to those at the other side.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A stretcher support unit for ambulances comprising, in combination, a frame having a pair of spaced upright substantially parallel frame members connected to each other and being adapted to be placed on the floor of an ambulance; an upper stretcher support extending in longitudinal direction between said upright frame members; means mounting said upper stretcher support on said upright frame members turnable about a first horizontal axis between an active position in which said upper stretcher support extends substantially normal to and in transverse direction to one side of said frame and a folded position turned downwardly about said axis into said frame; a lower stretcher support extending in longitudinal direction between said upright frame members; means mounting said lower stretcher support on said upright frame members turnably about a second substantially horizontal axis between an active position in which said lower stretcher support extends substantially normal to and in transverse direction to said one side of said frame and a folded position turned upwardly about said second axis into said frame, said first and said second axis being spaced in vertical and horizontal direction from each other so that said upper and lower stretcher supports overlap each other in substantially parallel relationship in said folded position thereof; upper and lower support means connected to and cooperating with said upper and lower stretcher supports, respectively, for supporting the latter in said active position, said upper and lower support means being foldable into said frame when not supporting said stretcher supports; and a pair of bracer means respectively connected to said upright frame members beneath said lower stretcher support, each pivotally movable about a vertical axis between a supporting position in which said bracer means extends in a plane substantially normal to said frame and engages with an end portion thereof distant from said vertical axis said floor for thus holding said frame in upright position, and a folded position turned into said frame.

2. A stretcher support unit for ambulances comprising, in combination, a frame having a pair of spaced upright substantially parallel frame members connected to each other and being adapted to be placed on the floor of an ambulance; an upper stretcher support extending in longitudinal direction between said upright frame members; means mounting said upper stretcher support on said upright frame members turnable about a first horizontal axis between an active position in which said upper stretcher support extends substantially normal to and in transverse direction to one side of said frame and a folded position turned downwardly about said axis into said frame; a lower stretcher support extending in longitudinal direction between said upright frame members; means mounting said lower stretcher support on said upright frame members turnably about a second substantially horizontal axis between an active position in which said lower stretcher support extends substantially normal to and in transverse direction to said one side of said frame and a folded position turned upwardly about said second axis into said frame, said first and said second axis being spaced in vertical and horizontal direction from each other so that said upper and lower stretcher supports overlap each other in substantially parallel relationship in said folded position thereof; a pair of support brackets respectively mounted on said upright frame members and each turnable about a vertical axis between a supporting position in which said brackets respectively extend in planes substantially normal to that of said frame and a folded position turned about said axis into said frame; cooperating means on said upper stretcher support and said support brackets for releasably connecting the same to each other in said supporting position of said brackets and said active position of said upper stretcher support to support the latter on said brackets; a pair of supporting legs pivotally connected to said lower stretcher support for turning movement between a supporting position in which said legs extend substantially normal to said lower stretcher support for supporting the same on said floor and a folded position turned against said lower stretcher support; and a pair of bracer means respectively connected to said upright frame members beneath said lower stretcher support, each pivotally movable about a vertical axis between a supporting position in which said bracer means extends in a plane substantially normal to said frame and engages with an end portion thereof distant from said vertical axis said floor for thus holding said frame in upright position, and a folded position turned into said frame.

3. A stretcher support unit comprising, in combination, a pair of upright substantially parallel frames spaced from each other in transverse direction; at least one stretcher support on each frame, said stretcher supports mounted on said frames respectively at the same elevation and extending transversely toward each other; a pair of arms mounted on each stretcher support on the side thereof facing the other stretcher support and each connected at one end thereof to the respective stretcher support pivotally about a horizontal axis so as to be turnable between an active position in which the pair of arms on one stretcher support extend upwardly inclined and toward the pair of arms on the other stretcher support and a lowered position; a stretcher support rail rigidly connected to the other ends of each pair of arms and forming therewith a rigid unit; at least one transverse member pivotally connected to one of said rigid units tiltably between a supporting position in which said transverse member engages the other rigid unit and a folded position folded against said one rigid unit; and releasable connecting means for releasably connecting the other end of said transverse member to the other rigid unit so that said transverse member forms when connected to said other rigid unit together with said rigid units a rigid connection between said stretcher supports on said frames.

4. A stretcher support unit as set forth in claim 3 in which said transverse member is pivotally connected to said stretcher support rail of said one rigid unit turnably about an axis which, when said arms are in said upwardly inclined position, extends substantially vertical.

5. A stretcher support unit comprising, in combination, a pair of upright substantially parallel frames spaced in transverse direction from each other; a pair of lateral stretcher support means respectively mounted in said frames turnably between an active substantially horizontal position in which said lateral stretcher support means extend transversely towards each other and a substantially vertical position turned into said frames, respectively; a central stretcher support means including a pair of supporting rails, and means for supporting said supporting rails on said lateral stretcher support means tiltable between an active position in which said supporting rails extend parallel to and respectively inwardly of the respective lateral stretcher support means and a folded position in which said supporting rails are folded against the respective lateral stretcher support means; and releasable means for connecting said supporting rails in said active position thereof to each other.

6. A stretcher support unit as set forth in claim 5 and including an additional stretcher support means having a pair of additional supporting rails, and means supporting said additional supporting rails tiltable between an active position respectively located beneath said supporting rails and a folded position folded against the respective lateral stretcher support means.

7. A stretcher support unit as set forth in claim 6 in which each of said support rails and additional support rails forms guide means for guiding a stretcher in longitudinal direction and in which each of said lateral stretcher support means comprises guide means on opposite ends thereof and extending in transverse direction of the respective stretcher support means for shifting a stretcher thereon in said transverse direction.

8. A stretcher support unit comprising, in combination, a pair of lateral stretcher supports transversely spaced from each other and having longitudinal edges substantially parallel to each other; means supporting said pair of lateral stretcher supports at the outer longitudinal edges thereof for pivotal movement about horizontal axes respectively extending along said outer longitudinal edges; central stretcher support means extending between and at a higher elevation than said lateral stretcher supports; at least one first support member for each of said lateral stretcher supports to support the same at the inner longitudinal edge thereof on a floor; at least one second support member extending in an active position between each of said lateral stretcher supports and said central stretcher support means for supporting the latter on said lateral stretcher supports and adapted when not supporting said central stretcher support means to be folded against the respective first support member; a bell crank for each of said first and second support members, each bell crank having a first and a second arm inclined with respect to each other; connecting means for pivotally connecting each of said bell cranks intermediate the free ends of said arms to the inner longitudinal edge of the respective lateral stretcher support for tilting movement about a horizontal axis between a first position in which said first arm projects outwardly and downwardly inclined from said axis and said second arm projects substantially horizontal and inwardly towards the other lateral stretcher support and a second position in which said first arm projects inwardly and downwardly inclined from said axis and said second arm projects substantially vertical upwardly from said axis, said first supporting member being pivotally connected at one end thereof to said free end of said first arm and said second support member being pivotally connected at one end thereof to the free end of said second arm, whereby tilting said bell crank into said second position will facilitate folding of said second support member against said first support member.

9. A stretcher support unit as set forth in claim 8 and including means for mounting said connecting means of each bell crank on the respective lateral stretcher support in at least two positions spaced in transverse direction of the respective lateral stretcher support from each other.

10. A stretcher support unit as set forth in claim 8 and including a bench co-ordinated with at least one of said lateral stretcher supports; means supporting said bench along one of the longitudinal edges thereof turnably about the horizontal axis extending along the outer longitudinal edge of said one lateral stretcher support between a substantially vertical and an active substantially horizontal position superimposed over said one stretcher support; and means on the other longitudinal edge of said bench for supporting the same in said active position on said free end of said second arm of the respective bell crank in said second position of the latter.

11. A stretcher support unit comprising, in combination, an upright frame; a stretcher support mounted on said upright frame turnably about a horizontal axis extending along one longitudinal edge of said stretcher support between an active horizontal position extending transversely to one side of the frame and a folded upright position turned into said frame; a pair of parallel guide means extending spaced from each other substantially normal to said longitudinal edge of said stretcher support; means mounting said guide means on one of the ends thereof for pivotal movement about said axis independent from the turning movement of said stretcher support; a bench extending transverse to and between said guide means; means connecting said bench at longitudinally spaced portion thereof to said guide means slidably in longitudinal direction of the latter; and means on the other longitudinal edge of said stretcher support for supporting said bench substantially parallel to said stretcher support when the latter is in said active position.

12. A stretcher supporting framework as defined in claim 11, in which said guide means comprise transverse rods, and said means for slidably connecting said bench to said guide means comprise members having a round cross section secured to said bench and slidable along said rods.

13. A stretcher supporting framework comprising a frame, an upper stretcher support, a lower stretcher support, means for pivoting said upper stretcher support relative to and toward said frame, means for pivoting said lower stretcher support relative to and toward said frame, a bench above said lower stretcher support, means for pivoting said bench relative to and toward said frame, said stretcher supports and said bench being pivotable between a folded position turned into said frame and an active position extending transversely to one side of said frame, means on said lower stretcher support for supporting said bench in the active position thereof when said lower stretcher support is in said active position, a back rest for said bench, and pivotable means independent of said upper stretcher support for pivotably connecting said back rest to said frame for pivoting said back rest relative to and toward said frame, said pivotable means being constructed so as to permit in inactive position of said back rest to tilt said upper stretcher support from inactive position to active position and back.

14. A stretcher supporting framework as defined in claim 13, in which said means for pivoting said upper stretcher support and said pivotable means for said back rest are disposed relative to each other so that said back rest may be pivoted over said upper stretcher support toward said frame.

References Cited by the Examiner

UNITED STATES PATENTS

| | | | |
|---|---|---|---|
| 669,363 | 3/01 | Fieldhouse | 5—9 |
| 872,554 | 12/07 | Brewster | 248—240.4 |
| 1,312,516 | 8/19 | Breitenbach | 296—19 |
| 1,919,439 | 7/33 | Little | 248—166 X |
| 1,968,232 | 7/34 | Thomas | 297—353 X |
| 2,216,243 | 10/40 | Kreidler | 296—19 |
| 2,276,236 | 3/42 | Latimer | 5—8 |
| 2,276,998 | 3/42 | Stollenwerk | 5—9 |
| 2,337,505 | 12/43 | Swift | 12—43 |
| 2,370,402 | 2/45 | Gutman | 296—19 |
| 2,391,051 | 12/45 | Windsor | 5—9 |
| 2,450,213 | 9/48 | Turner | 248—361 |
| 2,456,024 | 12/48 | Schofield | 296—19 |
| 2,528,307 | 10/50 | Heaney | 5—9 |
| 2,553,297 | 5/51 | Brumbaugh | 5—8 |
| 2,649,142 | 8/53 | New | 297—395 |
| 2,700,412 | 1/55 | Evans et al. | 5—9 X |

FOREIGN PATENTS

| | | |
|---|---|---|
| 1,052,550 | 9/53 | France. |

FRANK B. SHERRY, *Primary Examiner.*